Feb. 2, 1971              K. G. MERAT              3,560,180

GLASS METAL SEALING TECHNIQUE

Filed May 15, 1968              2 Sheets-Sheet 1

INVENTOR.
KATHLEEN G. MERAT
BY
Frank D. Pragar
ATTORNEY 3,560,180
Patented Feb. 2, 1971

3,560,180
GLASS METAL SEALING TECHNIQUE
Kathleen G. Merat, Lansdale, Pa., assignor to Philco-Ford Corporation, Philadelphia, Pa., a corporation of Delaware
Filed May 15, 1968, Ser. No. 729,260
Int. Cl. C03c 27/02
U.S. Cl. 65—23                2 Claims

ABSTRACT OF THE DISCLOSURE

A method of glass sealing metallic portions of a lead frame to produce a microcircuit flat pack wherein magnesia is applied to surface areas of the lead frame, the surface areas laying inside and outside of the metallic portions. A glass seal ring is superimposed over the metallic portions and is then sealed to those portions. The magnesia prevents the glass from wetting the surface areas to which the magnesia was applied. Thereafter, the magnesia is removed.

---

It has long been known that molten glass readily flows onto oxidized surfaces of the metals used for glass sealing, while the molten glass is rejected by a bare surface of such metal. In static condition the glass melt forms a conclave meniscus with the oxide but a convex one with bare metal. It is usually to rely on this behavior of hot, liquid glass when it is necessary to insure wetting of some areas by the glass melt and to prevent wetting of other areas. However, it is extremely difficult, if not impossible, to prevent oxidation of metal and thereby to achieve rejection of glass flow.

I was surprised to discover that the application of one metal oxide, magnesia, to a surface of glass sealing metal prevents molten glass from flowing onto said surface. It has occurred to me that the observed effect of a magnesia coating can be used to achieve stronger and more hemetic seals, by relatively simple techniques. Such an improved sealing effect is of great value for the so-called flat packs of microcircuits, and the invention will be described as applied in this field.

Heretofore it was usual in the fabrication of flat packs to abrade or otherwise remove certain surface portions of a glass-sealed unit, for instance by abrasion pursuant to the seal firing. This was necessary since the molten glass tended to spread from any glass-sealed surface portions onto the other surfaces, which are ultimately to be free of glass. The spreading of the glass could not, thus far, be prevented during the seal firing, as it is impossible to prevent the occurrence of at least some little oxidation of the metal, for instance by the glass itself. Even the slightest oxidation of the seal metal tended toward formation of a positive meniscus of the melt, and resulted in glass wetting. Of course removal of the glass, by such technique as abrading, was time consuming and expensive. In some cases the abrading operations, as well as certain other processes, also were conducive to internal breakage in glass seal portions, which in turn led to loss of hermetic sealing. These and related difficulties are overcome by the present invention.

Figure 1:
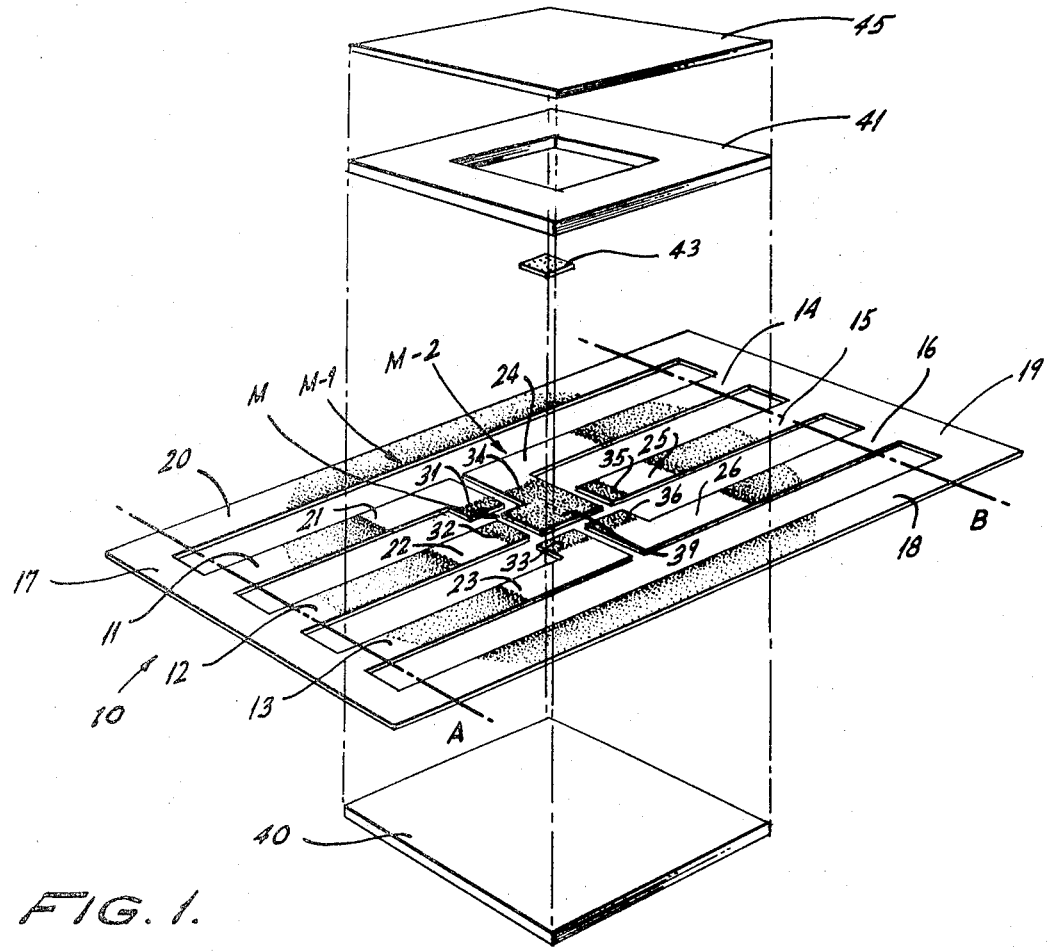
Figure 2:
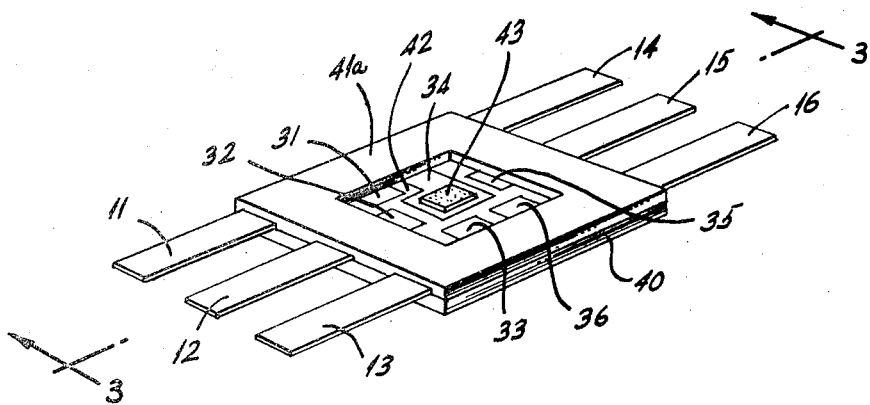

The invention will be described in detail with reference to the drawing, wherein FIG. 1 is an exploded perspective view of simple flat pack elements prepared in accordance with the new method. FIG. 2 shows the flat pack structure produced in accordance with the present invention and fully assembled except for application of its cover or lid.

Figure 3:
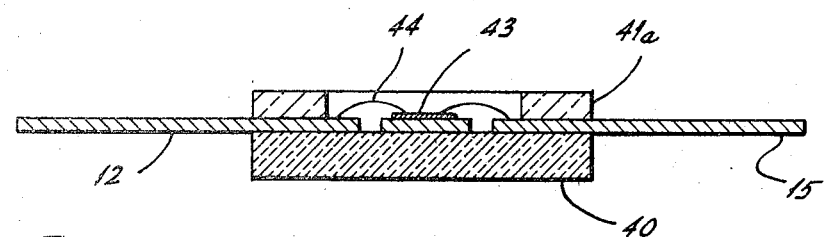
Figure 4:
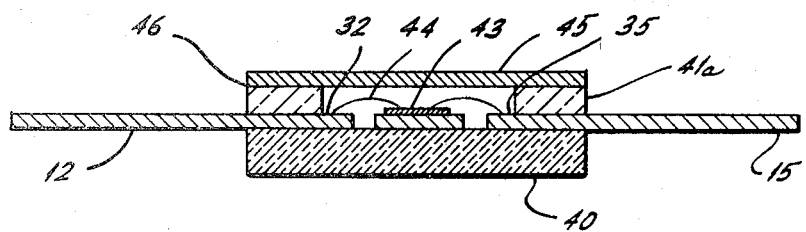
Figure 5:
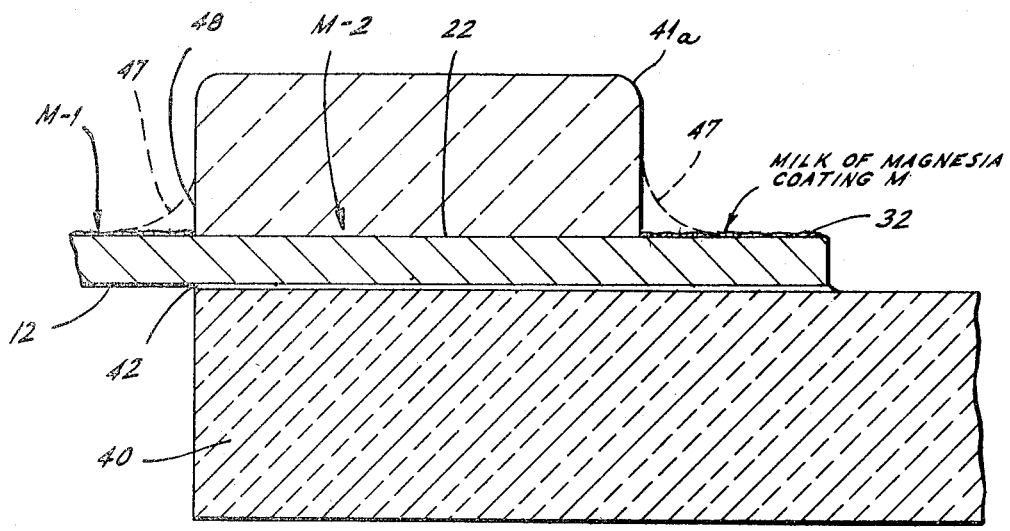

FIG. 3 is a fragmentary sectional view taken along line 3—3 in FIG. 2, while FIG. 4 is a similar view with a lid added thereto. FIG. 5 illustrates, on a larger scale, a fragment taken from FIG. 3. All figures are enlarged in comparison with typical actual sizes of flat packs for microcircuits.

FIG. 1 shows a lead frame 10 and also shows coatings M, M-1 of magnesia applied to certain metal surface areas of this lead frame in accordance with the invention. The coated areas include inner areas M and outer areas M-1, both on the top surface of the lead frame. No coating is applied to the bottom and side surfaces of this frame, and to certain top surface portions M-2 between the outer and inner ones, as will now be described in detail. As considered below, the lead frame preferably is made of an iron-nickel-cobalt alloy, although other metals, useable in glass-sealed units, can be substituted. As shown by the drawing, this frame is an integral, sheet-like structure which comprises a plurality of metallic lead-in electrode elements 11, 12, 13, 14, 15, 16, held together by outermost frame elements 17, 18, 18, 20. Between these elements, metal portions of blank 10 have been removed by conventional metal punching, or by other conventional procedures. A coating of magnesia is applied to outer surface parts M-1 of the leads, to be defined presently in a more specific way. Coating M of the same material is applied to innermost lead surface portions, while such coating is withheld or removed from intermediate surface parts M-2. The area comprising intermediate, uncoated parts M-2 is shown as having approximately square outline. Directly within this square outline, each lead (11 to 16) has a lead portion (21 to 26) not coated with magnesia. Innermost portions (31 to 36) of the leads, located approximately centrally of the aforementioned square, again are coated with magnesia, M-1. It will be seen that in effect, the said uncoated areas 21 to 26 form a square, ring shaped region M-2. These areas are likely to have surfaces of seal metal, oxidized to some extent, as oxidation of metal and alloy, by contact with the atmosphere or with glass, can hardly be avoided. However, oxidation of seal metal promotes glass wetting, while magnesia coating of the surface prevents glass wetting.

The magnesia coating can be applied successfully by spraying milk of magnesia—a suspension of magnesium hydroxide, $Mg(OH)_2$ in water—onto the metal surface, and then applying a suitable drying process to drive off water. Other coating methods can also be used, as will be understood by persons skilled in this art. The indicated distribution of coated and uncoated surface areas can be produced for instance by masking the square, ring shaped region M-2 of uncoated areas during the spraying of milk of magnesia. If preferred, the desired arrangement can also be produced by first coating the entire top surface of frame 10 with magnesia and then suitably removing this material from the square ring area. It is immaterial whether or to what extent the outermost parts of the lead frame—elements 17, 18, 19, 20—are coated.

A bottom element 40, made for example of suitable ceramic material, is provided below the metallic lead frame, as is known to persons skilled in this art. When the magnesia coating has been applied and the unit has been made ready for seal firing, a preformed glass seal ring 41—of square outline coinciding with the outline of the uncoated lead area M-2—is superimposed on this latter area. This glass ring and the metallic lead frame, resting in part on ceramic bottom 40, are then heated. The applied heat causes portions of the glass sear ring to be fused so as to adhere to the metal surfaces not coated with magnesia, including areas 21 to 26 of the metallic structure. Glass then also flows onto adjacent parts of ceramic bottom 40, and seals the leads to this bottom as shown at 42 (FIG. 5).

Thereafter the structure is allowed to cool so that the glass seal congeals. Magnesia coating portions M, M-1 are then removed, which can be done conveniently during normal stem cleaning procedures. As is known to persons skilled in this art, such procedures generally include a sequence of rinsing operations, followed by another drying operation. Thereafter, as is also known, lateral frame portions 17, 19 are removed by cutting them off along lines A, B (FIG. 1). Frame elements 18, 20 are then discarded. The resulting structure is shown in FIGS. 2 and 3. It is characterized by great accuracy in limiting the fused glass seal ring 41a to the exact lead frame areas where glass sealing is desired and needed. Fused, congealed glass portions 42 fill all crevices between metal and ceramic in the space within ring 41a. The exact areas of the originally magnesia-covered top surfaces 31 to 36, within the ring, remain uncovered by glass.

Next (FIG. 4) the flat pack is completed by incorporation of microcircuit chip 43, on central pad 39, and of whisker leads 44 connecting this chip to various lead frame terminals (see 32, 35). The flat pack is then covered by a lid 45, connected with glass ring 41a by a suitable bond 46. The space between this lid and underlying bottom 40 is fully and hermetically sealed by virtue of the new glass-to-metal seal 41a, 42.

Heretofore, the sealed condition of a flat pack was all too easily disturbed by the ultimate removal of frame elements such as 17, 19 (FIG. 1). Electronic parameters of the microcircuit were often affected by such impairment. The new construction avoids injury of this kind. An explanation is that heretofore (FIG. 5) fillets or concave menisci 47 were formed during the seal-firing at the edges of glass ring 41a adjacent lead frame portions not to be glass-sealed. Difficulty was then encountered when such fillets were removed, for instance by abrasion, and additional trouble ensued when lead frame portions were flexed, for instance incident to the ultimate cutting off of frame elements 17, 19. It appears that flexure of a lead tended to cause breaking-off of a fillet 47, which in turn often caused microscopic fractures to occur in glass-seal portions 42 underlying the inner lead portions. Such fractures or fissures were likely to break an original, hermetic seal. In the new glass-to-metal seal structure, fillets 47 are entirely avoided. In lieu thereof smooth surfaces 48 of the glass extend to their lines of contact with the metallic leads, in directions approximately normal to the lead surface, these surfaces of the glass being free of breaks and fissures.

I claim:

1. A method of glass sealing metallic portions of a lead frame and thereby producing a microcircuit flat pack, said method comprising: selectively applying magnesia to surface areas of the lead frame, one group of which areas lies directly outside said metallic portions while another group lies directly inside said portions; superimposing, over said metallic portions, a glass seal ring substantially coincident and in contact with said portions; seal firing the lead frame, with the seal ring so superimposed, to such a temperature that the glass of the seal ring melts and wets the metallic portions, the molten glass being prevented by the magnesia applied to said surface areas, from wetting said areas; thereafter removing the magnesia from said surface areas; and removing peripheral portions of the lead frame to form individual leads extending from the resulting flat pack.

2. A method as described in claim 1 wherein magnesia is removed by rinsing it from said surface areas of the lead frame.

References Cited

UNITED STATES PATENTS

| | | | |
|---|---|---|---|
| 2,923,585 | 2/1960 | Levin | 117—222 |
| 3,186,867 | 6/1965 | Forslund | 117—222 |
| 3,405,442 | 10/1968 | Caracciolo | 29—588 |
| 3,469,017 | 9/1969 | Starger | 65—59 |

S. LEON BASHORE, Primary Examiner

S. R. FRIEDMAN, Assistant Examiner

U.S. Cl. X.R.

29—588, 627; 65—59